W. LEWIN.
SPEED INDICATING DEVICE.
APPLICATION FILED APR. 3, 1915.
1,184,463.
Patented May 23, 1916.
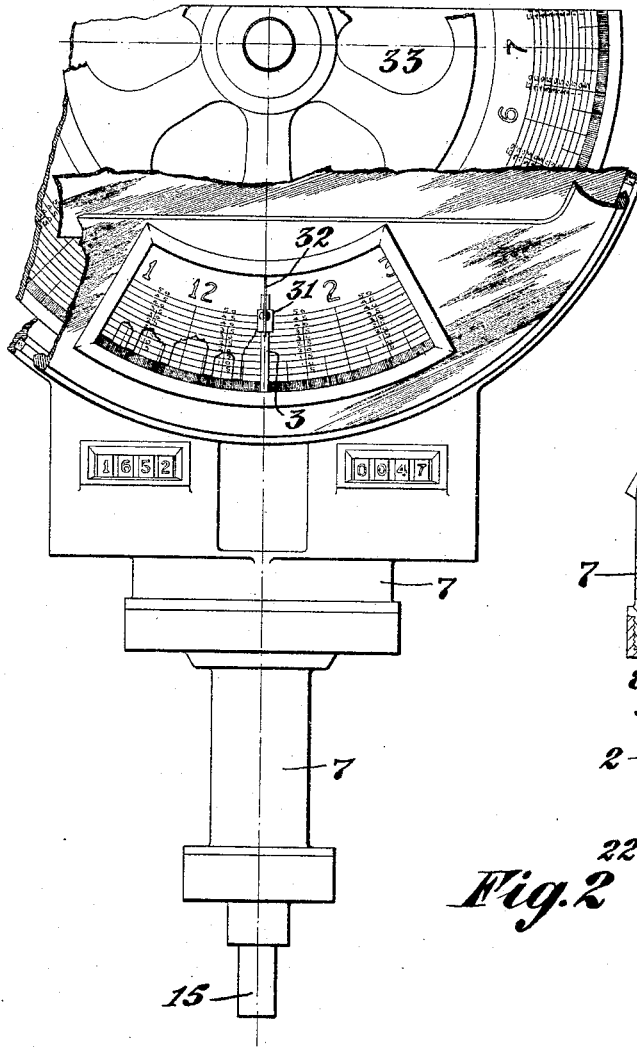
Fig.1
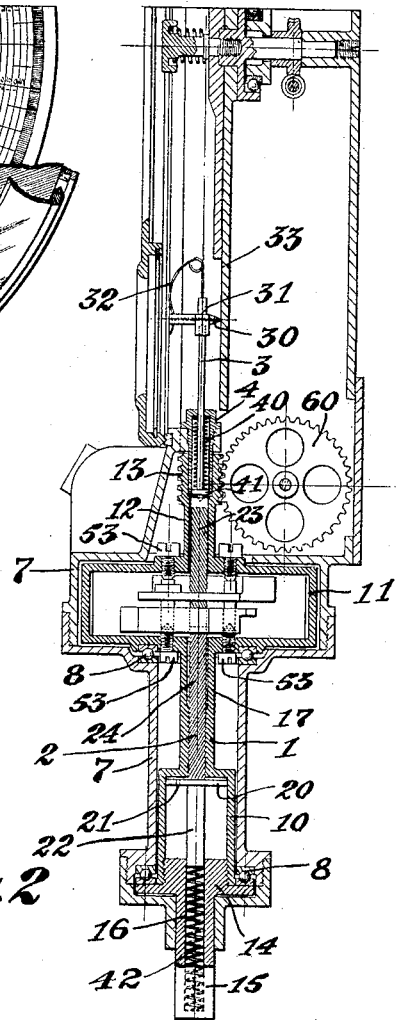
Fig.2
Fig.3
WITNESSES:
INVENTOR
Walter Lewin.
BY
Adams & Reynolds
ATTORNEYS

UNITED STATES PATENT OFFICE.

WALTER LEWIN, OF SEATTLE, WASHINGTON.

SPEED-INDICATING DEVICE.

1,184,463.  Specification of Letters Patent.  Patented May 23, 1916.

Application filed April 3, 1915. Serial No. 19,084.

*To all whom it may concern:*

Be it known that I, WALTER LEWIN, a subject of the King of Great Britain, and a resident of the city of Seattle, in the county of King and State of Washington, have invented certain new and useful Improvements in Speed-Indicating Devices, of which the following is a specification.

My invention relates to devices which are intended for indicating the speed of revolution of mechanisms and therefore I have termed it a speed indicator.

The object of my invention is to produce a device for this purpose which will be reliable in its indications, as free as possible from tremors in a permanent record made thereby, and not seriously affected by the jolting or vibrating of the mechanism upon which it is mounted.

It is also a further object to improve upon the mechanisms used in other respects.

The particular features and combinations of parts which comprise my invention will be hereinafter set forth and particularly defined by the claims which terminate this specification.

In the accompanying drawings I have shown my invention embodied in the form which is now preferred by me.

Figure 1 is a front or face elevation of my device, shown as combined with a permanent recording device, the latter being shown only in part. Fig. 2 is a sectional elevation taken on a central plane extending from front to rear thereof. Fig. 3 is a transverse section or plan taken just above the revolving weights.

A common failing of many devices which are employed for the indicating of the rotative speed of mechanisms, is that jarring or vibration of the mechanism upon which they are mounted, causes a corresponding vibration or fluctuation in position of the recording pencil, thus causing a ragged or serrated line, when the line should properly be a smooth, regular line. This feature is very prominently shown in recording devices which are mounted upon automobiles.

It is one of the chief objects of my invention to produce a mechanism which is particularly adapted for operation as a speed indicating device which may be attached to a recording mechanism and which will produce a smooth, accurate record, free from serrations or like inequalities caused by the vibrations of the indicating mechanism.

The working parts of my invention are shown as installed within a casing which is indicated by the character 7. This casing may be of any shape and construction which is desired and which also provides for the proper support and protection of the parts. A detailed description of this is not deemed necessary. Within this casing is a frame, which, as a whole, is indicated by the character 1, upon which is mounted the essential parts of the speed indicating mechanism. This frame 1 is mounted for rotation within the casing 7, as by ball bearings 8. The central stem 17, of this frame, has an axial bore, within which is mounted a rod or shaft 2, so that it may both turn and reciprocate axially. This rod or shaft has two adjacent sections, 23 and 24, provided with threads of high pitch, which are right handed on one section and left handed on the other. The revolving frame 1 has a stem or sleeve section 17, referred to above, which is threaded in its lower part to form a nut for the threaded section 23. The upper part of this stem 17 is counterbored sufficiently to permit free reciprocation of the shaft 2. The upper end of the shaft 2 is guided by a sleeve 12 which forms a part of frame 1.

The frame 1 has a yoke 11, within which are mounted the weights 5, by which the indicating member is controlled and operated. The general shape of these weights are shown in Fig. 3. Their pivots 6 are secured at each side of the axis of revolution of the device, being oppositely placed and at equal distances from said axis. They are shown as mounted upon the conical points of adjustable set screws 53, which are screwed in the yoke 11.

Each weight 5 has a segmental slot 50, which embraces the pivot axis of the other weight, and also a segment slot 51 which incloses the rod or shaft 2. One side of this latter slot is provided with teeth 52, the teeth of one weight member meshing with the teeth or threads of one section, 23, of the shaft 2, the teeth of the other weight member 5 meshing with the threaded section 24 of shaft 2, the latter section 24 also screwing into the threaded section 17 of the frame 1. The two weights swing synchronously and simultaneously upon their axes, but in opposite directions. They act as do the weights of a shaft governor. The shaft 2 turns with frame 1 and also has a limited rotative or oscillatory movement relative to this frame, such movement causing a limited axial movement of the shaft in the frame. The upper terminal sleeve 12 of the rotative frame has a worm-toothed section 13, which meshes with a wheel 60, or in any other suitable or desired manner, is connected to operate such integrating mechanism as it may be desired to combine with my mechanism. The kind of integrating mechanism to be used is immaterial to my invention. Entering the upper terminal sleeve 12, 13, is a sleeve 4, which is shown as fixedly held in place by screwing into a boss of the outer non-rotative casing 7, whereby it may be adjusted vertically and be removed, to facilitate the removal and replacement of the revolving frame 1. Externally this sleeve 4 forms a bearing for the worm section 13 which is the uppermost part of the revolving frame 1. Within the bore of this sleeve is a helical spring 40, which bears upon a button 41, on the lower end of the stem 3, which stem passes out through the top of the sleeve and has a guiding bearing with said top. The button 41, or the lower end of the stem 3, as the case may be, has a conical tip which enters a like recess in the upper end of the shaft 2, thereby forming a thrust bearing, which is necessary as the stem 3 is held against turning. The means to be employed for holding the stem 3 against turning is immaterial. This may be done by making the stem square and the hole in sleeve 4 through which it passes square also. As sleeve 4 does not rotate the stem 3 cannot rotate.

The lower end of the rod 2 enters bore 16, in the member 14 which is secured to the lower end of the revolving frame 1. In this bore is placed a spring 42 which is complemental to the spring 40 and acts upon the shaft or rod 2 oppositely to the spring 40. The weight of the parts and the action of these springs acting upon the rod 2, will hold this in its intermediate position when the frame 1 is stationary. In this condition the weights 5 will be in their middle position, the pivots 6 being centrally of the slots 50. The rod 2 is therefore free to operate either way from its position of rest and may thus be used to indicate variations above or below a normal, and also to operate by revolution of the frame in either direction. The springs 40 and 42 act through the shaft 2, in opposition to the centrifugal force generated by the rotation of the frame 1 upon which the weights 5 are carried. These parts form what is, in effect, a shaft governor. Upon its upper, outer end, the stem 3 carries a marker, designed for making a mark upon a paper, or like permanent record member. This marker as illustrated consists of a pencil 30 carried in a head 31 secured to the stem 3, the pencil being held yieldingly against the paper by a spring 32. The paper is in the form of a disk secured on the face of disk 33.

In the form of recording device which is partly shown in connection with my device, the disk 33 and the paper disk carried thereby, would be rotated through suitable clockwork. As these parts form no essential part of my invention, a detailed description thereof is deemed unnecessary.

To further secure against oscillations due to vibrations of the device as a whole, I have extended the central or axial shaft 2 downward and have connected therewith a piston 20 having a small port 21 therein and have shaped the revolving frame 1 so as to form a cylinder 10 which incloses this piston. This may be filled with mercury, oil or other liquid. These parts constitute a dash pot which will dampen all tremors and oscillations which are not of a steady, persistent character.

The operation of my device is as follows: The driving connection with the shaft 2 is made, in any convenient and suitable manner, with the extension 15 from the frame 1 for rotation thereof. This frame, being rotated, rotates the weights 5. These are normally held in a position which is intermediate that shown in full lines and that shown in dotted lines in Fig. 3. This is secured by a balance between the action of the springs 40 and 42 which force the shaft toward the central position and the action of the weights through the racks 52, and the threaded engagement of the rod 2 with the part 17 of the revolving frame.

When the weights are thrown outward by centrifugal force generated by their revolution, the segment teeth 52 will turn the shaft 2 and, the turning of this shaft will cause an axial movement therein by reason of its threaded engagement with the stem 17, and the high angle pitch of the threads on stem 2, whereby the pointer stem 3 and its pencil is reciprocated, the direction of this reciprocation varying with the direction of turning.

A distinctive feature of this device is its inability to show a false record from the jarring or jolting of a vehicle, if used for the purpose of recording movements of such vehicle, for instance, a quick, side movement would have a tendency to throw both balance weights in the same direction, thus causing a momentary locking effect, while an up or down shock has no effect on the weights to vary their angular position and can act only on the threaded rod, whose weight is not sufficient to move the balance weight against their direction of rotation; and again, any lost movement in the racks and thread is not taken up until a portion of the mercury is displaced in the dash pot.

Having thus described my invention, what I claim as new, and desire to secure by

Letters Patent of the United States of America, is:

1. In a speed indicating mechanism, in combination, a rotative member serving as a base or supporting frame for the working parts, a right-and-left-threaded shaft mounted for reciprocation in the rotative axis of said frame, and two weights pivoted away from said axis and having each a toothed segment meshing with one threaded section of said axially positioned shaft, the other threaded section engaging with a like threaded member carried by the revolving frame.

2. In a speed indicating mechanism, in combination, a rotative frame member serving as a base or support for the working parts, a right-and-left-threaded shaft mounted for rotation and reciprocation in the rotative axis of said supporting frame, two weights pivoted upon said frame and having teeth engaging one of the threaded sections of said shaft, a nut carried by said frame and engaging the other threaded section of said shaft, and a dash pot mechanism connected with said reciprocating shaft.

3. In a speed indicator, in combination, a rotative frame having an axially positioned bore, a right-and-left-threaded shaft mounted for rotation and reciprocation in said bore, weights pivoted upon said frame and having toothed segments engaging one of the threaded sections of said shaft, a nut carried by said frame and engaging the other threaded section of said shaft, a dash pot cylinder formed in said frame with its axis coinciding with the rotative axis of the frame and a piston in said cylinder and directly connected with said shaft.

4. In a speed indicating device, in combination, a frame member mounted for rotation, a right-and-left-threaded shaft mounted for axial reciprocation and rotation in the axis of said frame, two weights pivoted to said frame in similar opposite positions relative to said axis, each weight having a toothed segment in position to engage with one of the threaded sections of said shaft, the frame having a threaded section engaging the other threaded section of said shaft, the swinging ends of said weights being at opposite sides of the rotative axis of said frame from their pivots, each weight having a slot embracing the pivot of the other weight, and a spring acting on said shaft to move it in opposition to the centrifugal force generated in the weights.

5. In a speed indicating device, in combination, a base or frame member containing a yoke section, an axial bore at each side of said yoke for the reception of a shaft, and an enlargement of said bore at one end to form a cylinder, bearings for opposite ends of the frame, a shaft within said axial bore having contiguous right-hand-threaded and left-hand-threaded sections, the frame having a threaded section engaging one of said threaded sections of the shaft, two weights pivoted upon and between the top and bottom sides of said yoke and at equal opposite distances from the rotative axis of the frame, said weights extending with their major part to the opposite side of the rotative axis of the frame from the pivot of the respective weight, and being provided with slots for the accommodation of the axially positioned shaft and for the pivot of the other weight, each weight having a toothed segment engaging the teeth or threads of the other threaded section of said axially positioned shaft, a piston within the cylinder and connected with said shaft, and an indicating point operated by said shaft.

Signed at Seattle, Washington this 24th day of March 1915.

WALTER LEWIN.

Copies of this patent may be obtained for five cents each, by addressing the "Commissioner of Patents, Washington, D. C."